(12) United States Patent
Eberth et al.

(10) Patent No.: US 7,175,795 B2
(45) Date of Patent: Feb. 13, 2007

(54) METHOD FOR MANUFACTURING A FIBER REINFORCED SYNTHETIC COMPOSITE STRUCTURAL ELEMENT USING FIBER TEXTILE PREFORMS

(75) Inventors: Ulrich Eberth, Miltenberg (DE); Paul Joern, Hamburg (DE)

(73) Assignees: Airbus Deutschland GmbH, Hamburg (DE); Fraunhofer-Gesellschaft zur Foerderung der angewandten Forschung e. V., Munich (DE)

( * ) Notice: Subject to any disclaimer, the term of this patent is extended or adjusted under 35 U.S.C. 154(b) by 326 days.

(21) Appl. No.: 10/385,289

(22) Filed: Mar. 10, 2003

(65) Prior Publication Data

US 2003/0168775 A1     Sep. 11, 2003

(30) Foreign Application Priority Data

Mar. 8, 2002   (DE) ............................... 102 10 088
Nov. 6, 2002   (DE) ............................... 102 51 580

(51) Int. Cl.
*B29C 43/18* (2006.01)

(52) U.S. Cl. .................. 264/250; 264/257; 264/263

(58) Field of Classification Search ................ None
See application file for complete search history.

(56) References Cited

U.S. PATENT DOCUMENTS 2,169,788 A * 8/1939 Schulz et al. ............... 264/258
3,334,001 A * 8/1967 Tyhurst ....................... 156/228
3,574,805 A * 4/1971 Hatch et al. ................. 264/138

(Continued)

FOREIGN PATENT DOCUMENTS

DE     29 12 463     11/1979

(Continued)

*Primary Examiner*—Edmund H. Lee
(74) *Attorney, Agent, or Firm*—W. F. Fasse; W. G. Fasse

(57) ABSTRACT

A fiber textile semi-finished material is fed directly and reformed onto a carrier and reforming tool, where it is fixed with a binder. The carrier has a contour matching the negative or positive shape of the final required geometry of a preform that is to be fabricated. The reformed semi-finished article fixed with the binder is removed from the carrier to provide the preform. Several preforms of different cross-sectional shapes are joined together, compacted to form a dense component having nearly the required finished contour, impregnated with a matrix system including a curable adhesive resin, and then cured under an elevated temperature and/or pressure. The result is a finished fiber reinforced composite structural element such as an aircraft window frame. This method is carried out on an apparatus including the rotating carrier and reforming tool, which may have a cylindrical and/or annular surface for receiving and reforming the material.

29 Claims, 4 Drawing Sheets

U.S. PATENT DOCUMENTS

| | | | |
|---|---|---|---|
| 4,254,599 A | | 3/1981 | Maistre |
| 4,486,996 A | * | 12/1984 | Alejos ..................... 52/309.11 |
| 4,622,091 A | | 11/1986 | Letterman |
| 4,625,484 A | * | 12/1986 | Oboler ........................ 52/251 |
| 4,649,080 A | | 3/1987 | Fischer et al. |
| 4,891,179 A | | 1/1990 | Peacock et al. |
| 4,927,706 A | * | 5/1990 | Born ....................... 428/304.4 |
| 5,217,766 A | | 6/1993 | Flonc et al. |
| 5,292,570 A | * | 3/1994 | Ehnert et al. .................. 428/74 |
| 5,322,582 A | * | 6/1994 | Davies et al. ............... 156/180 |
| 5,546,880 A | | 8/1996 | Ronyak et al. |
| 5,593,633 A | * | 1/1997 | Dull et al. .................. 264/510 |
| 6,887,914 B2 | * | 5/2005 | Czaplicki et al. ........... 521/178 |
| 6,890,470 B2 | | 5/2005 | Staub et al. |
| 6,920,693 B2 | * | 7/2005 | Hankins et al. ............ 29/897.2 |
| 2003/0173019 A1 | | 9/2003 | Eberth et al. |
| 2003/0222371 A1 | | 12/2003 | Edelmann et al. |
| 2004/0219251 A1 | | 11/2004 | Eberth et al. |

FOREIGN PATENT DOCUMENTS

| | | |
|---|---|---|
| DE | 39 10 733 | 10/1990 |
| DE | 43 14 078 | 3/1994 |
| DE | 695 16 105 | 12/2000 |
| EP | 0 185 460 | 6/1986 |
| JP | 62-207633 | 9/1987 |

* cited by examiner

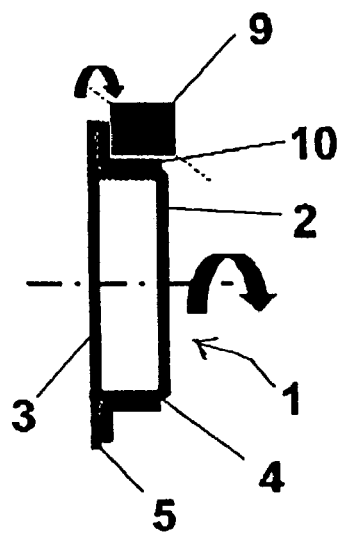
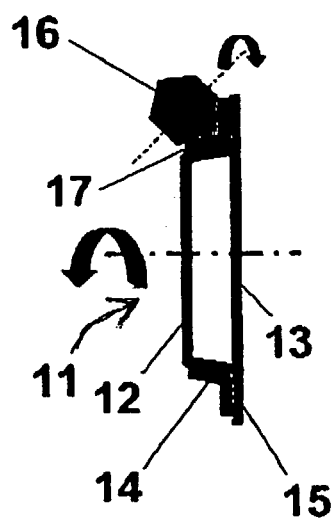
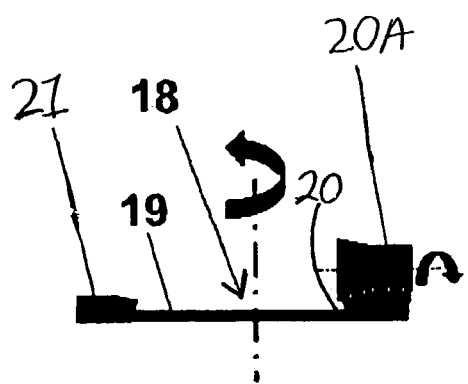
Fig.3A    Fig.3B    Fig.3C
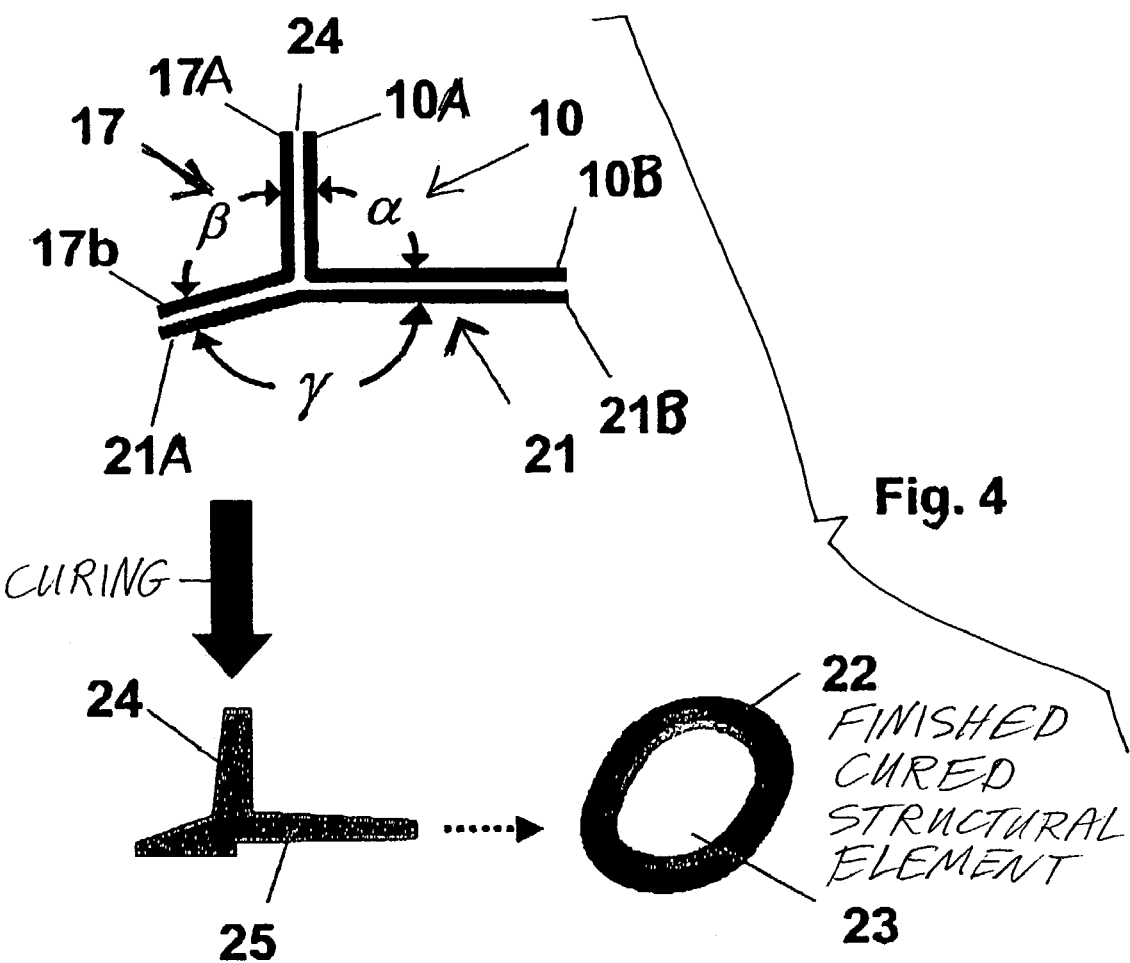
Fig. 4

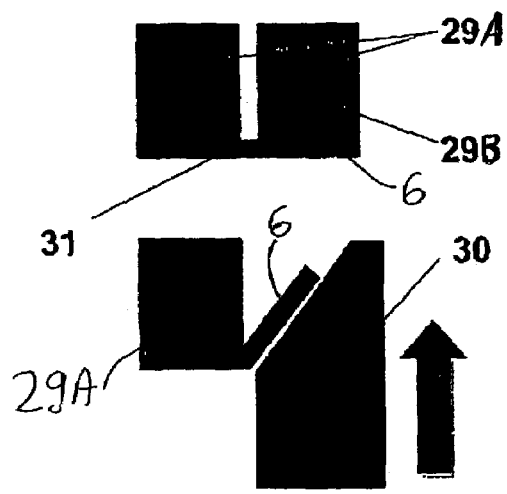
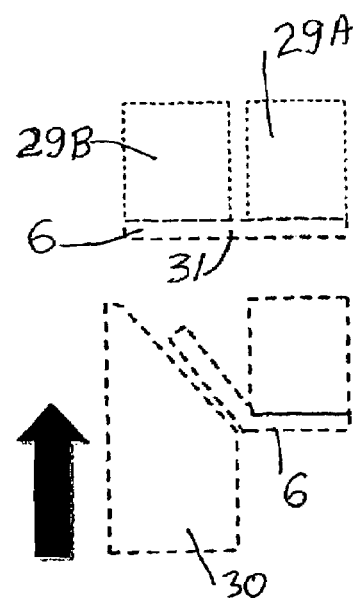
Fig. 6B
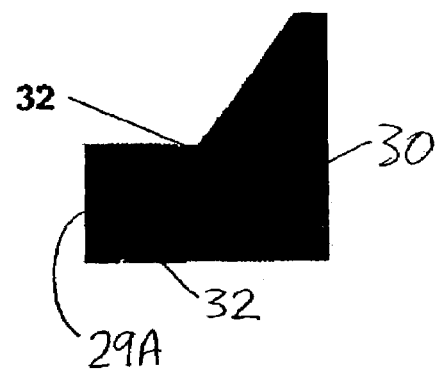
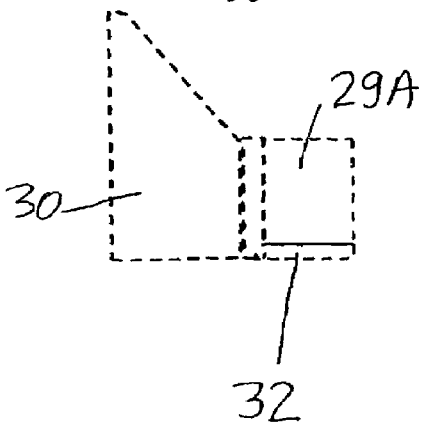
Fig. 6C
Fig. 6D

METHOD FOR MANUFACTURING A FIBER REINFORCED SYNTHETIC COMPOSITE STRUCTURAL ELEMENT USING FIBER TEXTILE PREFORMS

CROSS-REFERENCE TO RELATED APPLICATION

This application is related to application Ser. No. 10/385,287 filed on Mar. 10, 2003 now U.S. Pat. No. 7,008,580. The entire disclosure of the related application is incorporated herein by reference.

PRIORITY CLAIM

This application is based on and claims the priority under 35 U.S.C. §119 of German Patent Applications 102 10 088.8, filed on Mar. 8, 2002, and 102 51 580.8, filed on Nov. 6, 2002, the entire disclosures of which are incorporated herein by reference.

FIELD OF THE INVENTION

The invention relates to a method and an apparatus for manufacturing a structural element of fiber reinforced synthetic composite material, and especially a window frame for an aircraft window, using textile semi-finished materials or articles that are further processed and formed to produce textile preforms.

BACKGROUND INFORMATION

In present conventional aircraft construction, the window frames are predominantly manufactured as forged aluminum components. In order to reduce the weight of the window frames and thereby save weight in the overall aircraft construction, it is desired to manufacture aircraft window frames of fiber reinforced synthetic plastic materials.

For fabricating structural elements from fiber reinforced synthetic materials, it has previously been the practice to use textile intermediate products, so-called semi-finished materials or semi-finished articles such as woven webs and braided materials. At the end of the manufacturing process that produces the respective semi-finished material, the material is applied in or on an intermediate carrier. In the case of a woven web as the semi-finished material, the intermediate carrier may, for example, be a cylindrical body upon which the woven web material is wrapped or wound as an encircling strip. The geometry of such an intermediate carrier does not serve for preforming or reforming the configuration of the semi-finished material, but instead merely serves as an auxiliary support for transporting and storing the semi-finished material. During the course of the further manufacturing process, the semi-finished material or article is again removed from the intermediate carrier body, and is then processed, handled, or made up as necessary, and is then finally brought into the desired form or configuration of the required preform, by carrying out reorienting and reforming (e.g. draping) of the fiber body of the semi-finished material.

The fiber material of the preform can be fixed through the use of a binder. The typically used binder systems mainly comprise thermoplastic substances, which are applied onto the semi-finished material, for example in the form of a powder, and are then activated under the influence of temperature. In addition to fixing or securing the fiber orientation of the fibrous material, the binder systems can also be used to fix the resulting preform into a densified or compacted state.

SUMMARY OF THE INVENTION

In view of the above, it is an object of the invention to provide a method and an apparatus of the above described general type, which can achieve an efficient and economical manufacturing of structural elements by optimally using the advantageous characteristics of fiber reinforced synthetic materials. It is another object of the invention to simplify and economize the prior conventional methods and apparatus in this context. The invention further aims to avoid or overcome the disadvantages of the prior art, and to achieve additional advantages, as apparent from the present specification.

The above objects have been achieved according to the invention in a method of manufacturing a fiber reinforced synthetic composite structural element, including the following steps or features. As a starting point, textile semi-finished materials are respectively arranged on respective allocated carriers, and are fixed with a binder. In this regard, each carrier respectively has a contour shape corresponding to the negative or positive of a final contour or geometry of the associated preform that is to be formed from the textile semi-finished material arranged on this carrier. After the textile semi-finished material has been arranged, shaped and fixed with a binder on the respective carrier to form thereof a semi-finished article, the carrier is removed to leave the semi-finished article as a respective preform.

A plurality of respective different preforms have shapes that are adapted to each other and to the finished structural element that is to be produced. The plural preforms are arranged with respect to each other so as to achieve the desired resulting total or overall geometry of the structural element that is to be formed. The several respective preforms are then combined or assembled together and subjected to a compacting step to form a densely compacted component having at least nearly or exactly the desired final contour of the structural element that is to be formed. Then the assembled and compacted preforms, in the shape of the final structural element, are saturated or impregnated with a matrix system comprising a curable adhesive resin, and are then cured and hardened under an elevated temperature and possibly also an elevated pressure as required, to form the structural element such as an aircraft window frame.

According to preferred embodiments of the inventive method, the semi-finished material is subjected to a shaping, reforming and/or draping process while being arranged on the carrier, so as to reorient previously unfixed fibers of the semi-finished material into the desired final orientation of the fibers in the preform. The binder can be applied in the form of a liquid, a paste, a powder, a thread, or a planar web or sheet. The binder can then be activated to achieve its binding effect by heating with hot air, flame heating, infrared heating, induction heating, laser heating, direct contact or conduction heating, or microwave heating.

Furthermore, each preform may preferably be made of several textile layers that are laid up one on top of another, or simply from individual textile layers. Particularly, for manufacturing a window frame as the final product, each preform may already have an oval shaped contour, or may simply have the shape of a segment of the oval. In a particular embodiment, plural oval preforms, each having an oval opening and respective angled flanges are combined together to form the finished product, namely an aircraft window frame. In this context, each flange of a respective preform is arranged adjoining and extending along an adjacent flange of a neighboring preform. The preforms together form an oval planar window frame with a web protruding substantially perpendicularly to the plane of the window frame. Particularly, three preforms may be combined in this manner, whereby respective adjacent flanges of the neighboring pairs of preforms are joined together to form three webs or frame flanges, of which two webs form the planar main frame body of the window frame, and the perpendicular protruding web of the window frame is formed by the two other remaining flanges of two of the preforms. A core element may be arranged between the adjoining flanges of the three preforms.

The above objects have further been achieved according to the invention in an apparatus for carrying out the inventive method. Particularly, the apparatus includes a rotating carrier and reforming tool and/or a rotating material supply and laying head for laying down the semi-finished fiber material on the carrier and reforming tool. The carrier and reforming tool has a cylindrical or annular receiving surface for receiving the textile semi-finished fiber material arranged thereon. The carrier and reforming tool may be embodied as a rotating drum with a cylindrical outer receiving surface, and with a boundary flange disc arranged on the side of the drum. The disc has a larger outer diameter than the drum and protrudes radially outwardly beyond the circumferential receiving surface of the drum, to present an annular flange-like receiving surface for another portion of the semi-finished material that will form one of the flanges or webs of the respective preform. The apparatus may further include reforming and pressing rolls or other counter elements that cooperate with the carrier and reforming tool so as to position and press the semi-finished material against the carrier and reforming tool. Furthermore, the material laying head can be provided to cooperate with the receiving surface of the carrier and reforming tool to achieve a defined positioning of the semi-finished material. The carrier may especially be a two-part carrier of which one part can be moved away, to allow the further cooperation with a draping tool that drapes and reshapes the semi-finished material to form thereof the preform having the desired final contour.

A substantial advantage of the invention is achieved in that the semi-finished material is applied onto a carrier that has a contour or geometry adapted to the contour or geometry of the preform that is to be manufactured, and then the reformed semi-finished article is fixed with this contour or geometry by means of a binder. Thus, advantageously, the semi-finished materials do not need to be first arranged and secured on a temporary intermediate carrier, which merely acts as a support for storage and transport of the material. Rather, the semi-finished materials are brought directly from the respective textile manufacturing process by which they were produced, onto the respective carriers having the desired contours. Thereby, the omission of the intermediate step has the advantage of reducing or avoiding the occurrence of damage and undulations of the fibers of the semi-finished material as a result of the intermediate handling thereof. It is, however, also possible to use any conventional textile semi-finished materials (for example braided materials, woven materials, non-woven materials, laid-up materials or the like) in this process, namely to be arranged directly from the textile manufacturing process onto the specially contoured carrier or reforming tool. It is further advantageous according to the invention that the preforms produced in this manner have shapes that are respectively tuned or adapted to each other and simultaneously to the overall or total geometry of the structural element that is later to be fabricated therefrom. The individual preforms are assembled together in a subsequent compacting step, and are thereby combined to form a densely compacted component having nearly or exactly the required final contour or configuration.

BRIEF DESCRIPTION OF THE DRAWINGS

In order that the invention may be clearly understood, it will now be described in connection with example embodiments thereof, with reference to the accompanying drawings, wherein:

FIG. 3A is a schematic side view generally corresponding to a first embodiment and shape of a carrier and reforming tool as also shown in FIGS. 1B and 2A, for forming a first shape or type of preform;

FIG. 3B is a schematic side view generally similar to FIG. 3A, but of another shape of a carrier and reforming tool for forming a second type or shape of preform;

FIG. 3C is a schematic side view of a further embodiment of a carrier and reforming tool configured as a rotating disc that cooperates with a pressing roller to form an annular shaped preform that is substantially planar or only slightly deviates from a plane;

FIG. 4 schematically illustrates the sequence of manufacturing a structural element from three prefabricated preforms of fiber reinforced synthetic composite material;

FIG. 6B is a sectional view showing a second step of this alternative process;

FIG. 6C is a sectional view schematically showing a third step of this alternative process, in which a flange of the semi-finished material is being draped or deflected at an angle relative to the other flange; and FIG. 6D is a sectional view showing a final step of the alternative process.

DETAILED DESCRIPTION OF A PREFERRED EXAMPLE EMBODIMENT AND OF THE BEST MODE OF THE INVENTION

Figure 1A:
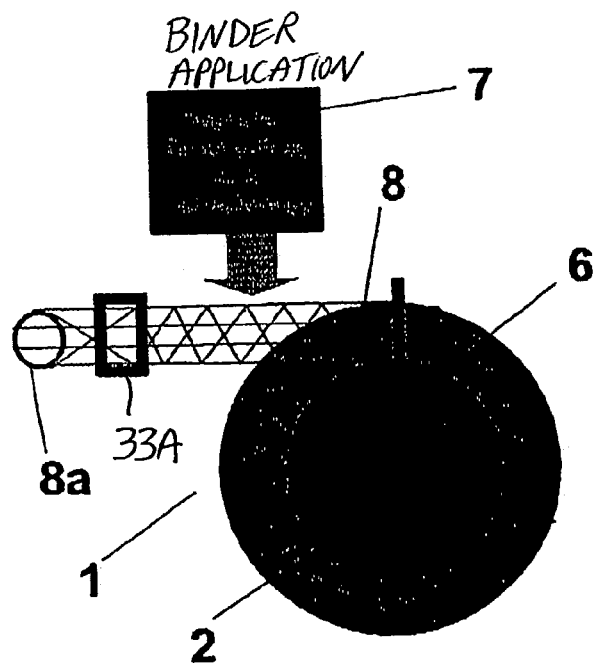
FIG. 1A is a schematic front elevation view of a representative apparatus for carrying out a manufacturing process for manufacturing a preform from a braided tube or hose as a semi-finished material.
Figure 1B:
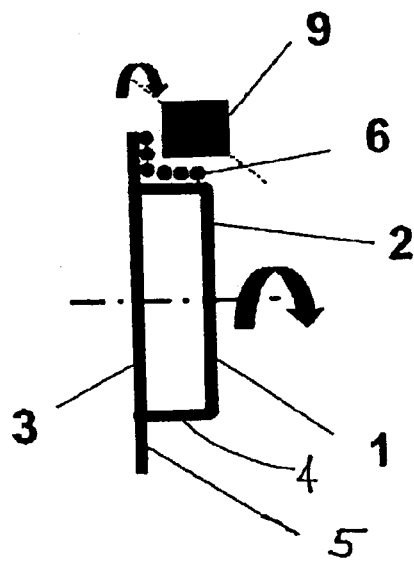
FIG. 1B is a schematic side view of the apparatus carrying out the process according to FIG. 1A.

The apparatus schematically illustrated in FIGS. 1A and 1B includes a rotating carrier and reforming tool 1, which comprises a cylindrical drum 2 and a bounding flange disc 3 secured to a side of the drum 2. The diameter of the bounding flange disc 3 is larger and extends outwardly beyond the diameter of the drum 2. Thus, the bounding flange disc 3 presents a radially extending annular flange-like receiving surface 5 for receiving a portion of a textile semi-finished article 6 thereon, while the drum 2 presents an outer cylindrical receiving surface 4 for another portion of the textile semi-finished article 6.

The textile semi-finished article 6 is formed by reforming, arranging and fixing on the tool 1, a textile semi-finished material 8, especially in the form of a loose drapable braided material 8 in the present embodiment. The braided material 8 may be in the form of a flat braided web or a circular braided tube or hose, which is, however, provided in a flattened and doubled configuration. This braided material 8 may optionally be provided with a binder 7 applied thereto. The binder 7 can be applied in the form of a powder, thread, surfacial web, or sheet, or other configurations, whereby the binder 7 may then simultaneously or directly thereafter be activated by means of hot air, flames, infrared heating, microwave heating, or other heating means.

The semi-finished textile material 8 is fed from a supply head 33A to the carrier and reforming tool 1, so as to be draped onto the cylindrical receiving surface 4 and the annular receiving surface 5. The drum 2 serves simultaneously for fixing the shape and position of the textile semi-finished material 8 and for transporting the resulting reformed semi-finished article 6. Additional reforming and pressing rollers 9 can be provided, to cooperate with the cylindrical receiving surface 4 and the annular flange-like receiving surface 5, so as to achieve a defined position and reforming of the semi-finished article 6 on the carrier and reforming tool 1. These reforming and pressing rollers 9 may optionally be equipped with heating and/or cooling devices for the above mentioned activation of the binder 7.

Figure 2A:
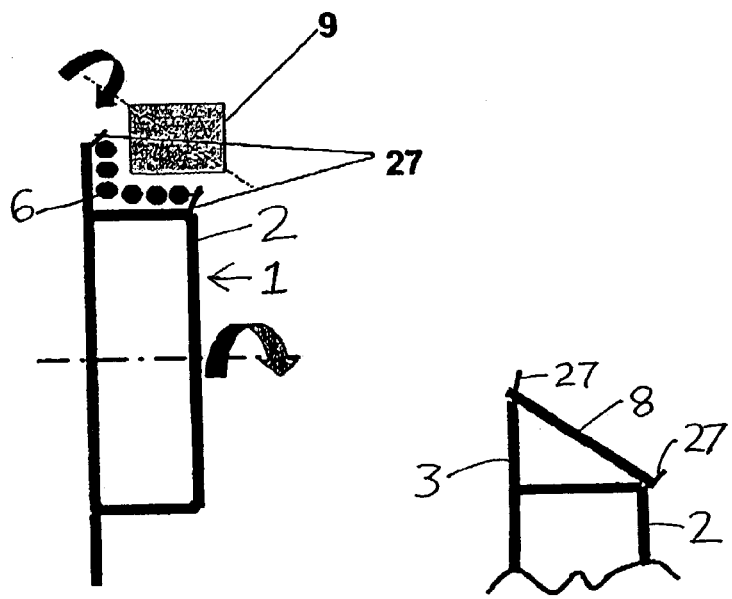
FIG. 2A is a schematic side view showing a reforming and pressing roller that reforms and presses the semi-finished material against the carrier or reforming tool, with the semi-finished material fixed in place at the edges thereof.
Figure 2B:
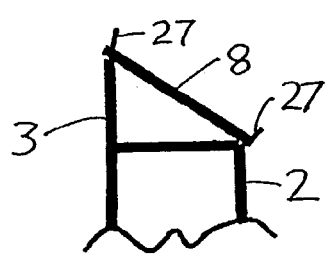
FIG. 2B is a schematic side view representing a first step of fixing the edges of the semi-finished material with pins.
Figure 2C:
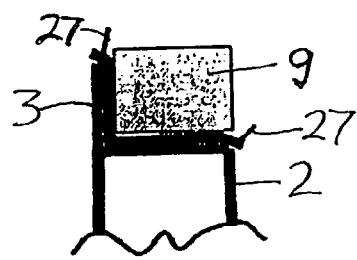
FIG. 2C is a view similar to FIG. 2B, but showing the subsequent second step after the semi-finished material has been fixed with pins along its edges, and then pressed by the reforming and pressing roller.

FIGS. 2A, 2B and 2C show a further aspect of the process carried out generally in accordance with FIGS. 1A and 1B. Namely, the semi-finished material 8 is preferably positioned, held and fixed by fixing elements 27 with respect to the carrier and reforming tool 1. The fixing elements may comprise pins, clamping elements, a binder fixation, or transport and clamping bands. These fixing elements 27 serve to position and fix the semi-finished material 8 relative to the carrier and reforming tool 1 while the material 8 is being draped and reformed thereon. FIGS. 2B and 2C show an example in which the fixing elements 27 comprise fixing pins that fix the lateral edges of the semi-finished material 8 to the respective corresponding edges of the flange disc 3 and of the drum 2. FIG. 2B shows the initial fixing step using the fixing pins 27, before the subsequent step of FIG. 2C, in which the reforming and pressing rollers 9 then reform and press the semi-finished material against the cylindrical receiving surface 4 of the drum 2 and the annular receiving surface 5 of the flange disc 3. Thereby, the fixing pins 27 ensure a proper positioning of the semi-finished material 8 relative to the carrier and reforming tool 1, without allowing the semi-finished material 8 to shift laterally out of its proper position while it is being reformed and pressed against the tool 1 by the roller 9.

FIG. 3A schematically represents the carrier and reforming tool 1 of FIG. 1A in a simplified manner. It can clearly be seen that the reforming and pressing roller or element 9 contacts directly on and presses directly against the semi-finished material 8 to form the reformed semi-finished article 6. The outer cylindrical receiving surface 4 of the drum 2 and the annular receiving surface 5 of the flange 3 form an angle therebetween, i.e. extend at an angle relative to each other, whereby this angle is 90° in the example of FIG. 3A. As the semi-finished material 6 is pressed against these receiving surfaces 4 and 5 by the roller 9, the semi-finished material 6 is thereby reformed into the semi-finished article 8 in the configuration of a first oval preform 10 or segments thereof, having an oval opening and two flanges 10A and 10B protruding at an angle α relative to each other (also see FIG. 4). Namely, the two flanges 10A and 10B of the preform 10 are respectively formed extending along the annular receiving surface 5 and the cylindrical receiving surface 4 of the carrier and reforming tool 1. Once the preform 10 has been formed in this shape and fixed by the applied binder, it may be removed from the reforming tool 1.

FIG. 3B schematically shows a further carrier and reforming tool 11 that is generally similar to the tool 1 of FIG. 3A, except that its drum 12, flange disc 13, and respective receiving surfaces 14 and 15 have a different configuration relative to each other in comparison to the embodiment according to FIG. 3A. Particularly, the angle formed between the cylindrical receiving surface 14 and the annular receiving surface 15 is greater than 90°. The reforming and pressing roller 16 is correspondingly adapted to this angle and the relative position of the cylindrical receiving surface 14 and the annular receiving surface 15, to cooperate therewith. Using this apparatus, a second oval preform 17 having an oval opening and flanges 17A and 17B respectively extending at an angle β>90° therebetween can be formed (see also FIG. 4).

FIG. 3C shows yet a further embodiment or configuration of a carrier and reforming tool in the form of a rotating disc 18 with an essentially annular receiving surface 20 on a side face 19 of the rotating disc 18. This disc 18 cooperates with a reforming and pressing roller 20A, which presses the semi-finished material against the receiving surface 20, to form a third configuration of an oval preform 21, which is essentially planar, or may have a slight bend, corresponding to an angled or tapered portion of the receiving surface 20. This forms the oval preform 21 to have two flanges 21A and 21B with an obtuse angle γ of nearly 180°, or a flat angle of exactly 180°, therebetween (see also FIG. 4). Especially this third preform 21 can be fabricated by a lay-up process.

Figure 6A:
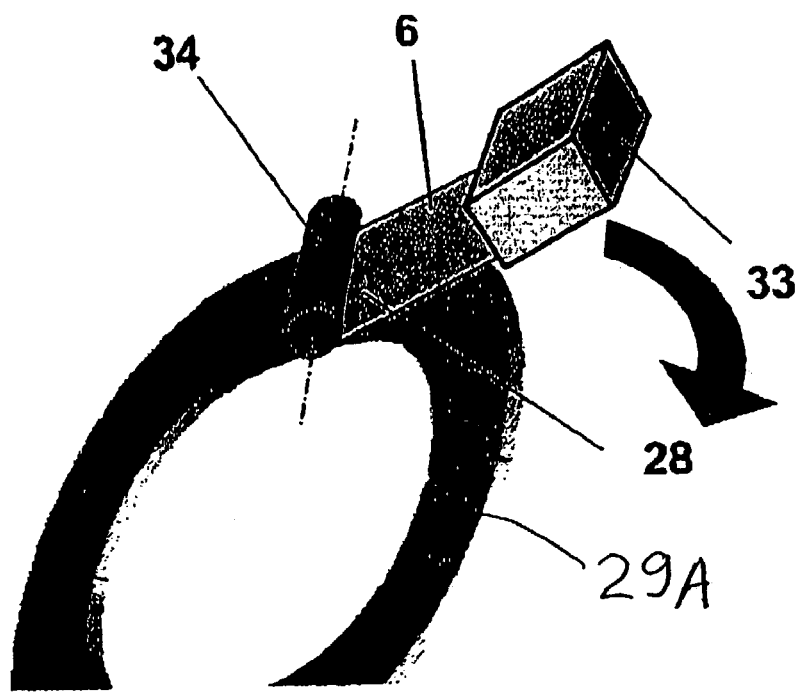
FIG. 6A is a schematic perspective view illustrating a first step of an alternative process for laying up and draping a semi-fabricated material.

A further possible embodiment of a fabrication method for forming oval preforms with a substantially L-shaped cross-section including two webs or flanges, is schematically shown in the sequence of FIGS. 6A, 6B, 6C and 6D. A band or strip-shaped textile semi-finished material 6 is laid onto a planar two-part lay-up matrix or lay-up tool 29A, by rotating the laying head 33 which feeds the material 6, or rotating the lay-up matrix 29A, relative to each other, so as to lay the semi-finished material 6 in a laying process 28 as shown in FIG. 6A. Thereby, a draping and positioning element 34 can assist in laying the material 6 in the proper position onto an annular receiving surface of the lay-up matrix 29A, to form a planar laid-up semi-finished article 31. The resulting configuration is shown schematically in section in FIG. 6B.

Next, a removable part 29B of the two-part lay-up tool or matrix 29A is removed, to free or expose one portion of the laid-up material 6, which is then draped or reformed at an angle relative to the other remaining portion of the material onto an inner circumferential cylindrical receiving surface of the matrix 29A, by using a draping tool 30 as shown in FIG. 6C. The result of this step, as schematically shown in FIG. 6D, is a reformed or draped preform 32 having two webs or flanges protruding in an L-section shape at substantially 90° relative to each other.

After plural preforms have been fabricated in any manner as described above, whereby the preforms preferably have different sectional configurations, these preforms may be assembled together to fabricate a complete finished product of fiber reinforced synthetic composite material, such as an aircraft window frame 22 having an oval opening 23 to receive an aircraft window therein, as schematically indicated in FIG. 4. Particularly, three oval preforms 10, 17 and 21, having respective different angles α, β, and γ between their respective two shanks or flanges 10A and 10B, 17A and 17B, and 21A and 21B respectively, as described above, are assembled together as shown at the top of FIG. 4, to form the represented cross-section through combined preform component for forming the finished window frame 22.

The two respective neighboring webs or flanges 10A and 17A, 17B and 21A, and 21B and 10B extend along one another and are joined pairwise to one another. Thereby, the third preform 21 with its webs or flanges 21A and 21B extending at a relatively flat angle γ of slightly less than 180°, or even exactly 180°, is joined to one flange 17B of the preform 17, and one flange 10B of the preform 10, to form the major base member or main frame body of the window frame 22. On the other hand, the two remaining shanks 10A and 17A of the preforms 10 and 17 are joined together to form the web 24 of the window frame 22, which protrudes nearly perpendicularly from the base member or body (e.g. within +/−20° of perpendicular). The three angles α, β, and γ sum up to 360° as apparent at the top of FIG. 4.

It should be noted that the preforms 10, 17 and 21 can respectively be fabricated of plural wound or wrapped textile layers that are stacked or layered one on top of another, or out of previously fabricated sub-preforms that are laid-up and assembled together to form each preform portion of the window frame. For example, a plurality of the preforms 10 can be laid-up and arranged together to form thereof a thicker preform shown as preform 10 in FIG. 4. In this manner, any required thickness of the preforms or the flanges of the window frame 22 can be achieved, in order to provide the required strength of the window frame 22.

Figure 5:
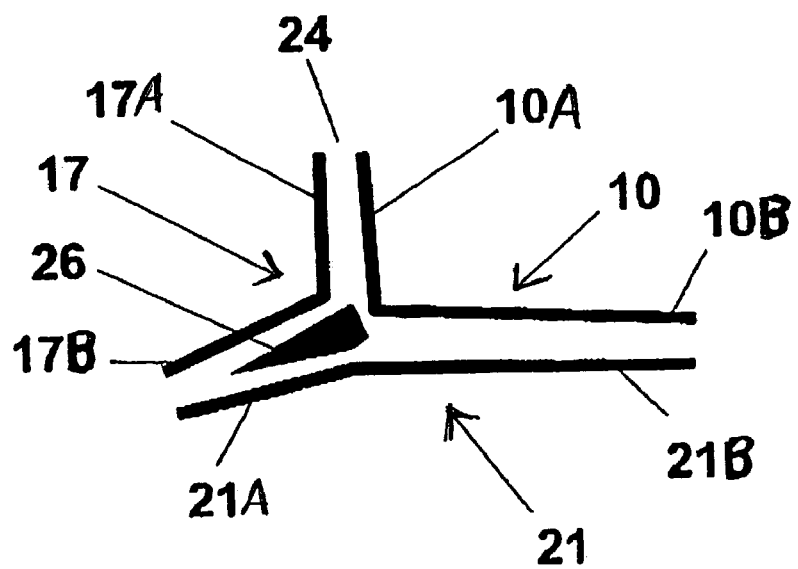
FIG. 5 is an enlarged schematic sectional view showing a wrapping or lay-up core inserted and enclosed between three preforms.

It is further possible, as shown in FIG. 5, to introduce a winding, wrapping or lay-up core 26 as a further auxiliary preform element, between the neighboring shanks 10A, 10B, 17A, 17B, 21A and 21B of the three preforms 10, 17 and 21, to provide a reinforced core, or to provide desired shaping of the cross-section of the window frame 22. This core 26 also contributes to the strength of the window frame 22, and can provide attachment points and the like for securing other components in the finished installation of the window frame.

As further shown in the sequence of FIG. 4, after the three preforms 10, 17 and 21 have been positioned and assembled together in the general cross-sectional configuration of the finished window frame 22, the preforms 10, 17.and 21 are then fixed in this position, injected with a curable matrix system, for example including a curable resin, and then subjected to a compacting step, to result in a highly densely compacted intermediate window frame component as a fiber reinforced composite component having exactly or nearly the required final contour, e.g. the final required cross-sectional shape 25. This window frame component impregnated with the matrix system including a curable adhesive resin is then cured at an elevated temperature and, if necessary, an elevated pressure to result in the finished window frame 22. The matrix injection, compacting, and curing steps can be carried out in any conventionally known process and using any conventionally known equipment, for example in an RTM tool, in an oven or autoclave, or in a hot press after injection of the resin matrix system.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of manufacturing a structural element of fiber reinforced synthetic composite material, comprising the steps:
  a) arranging respective fiber textile semi-finished materials respectively on plural carriers, which respectively have carrier contours that correspond to a positive or a negative of at least a portion of respective preform contours of respective preforms that are to be produced;
  b) applying a binder respectively to said semi-finished materials, and fixing said semi-finished materials respectively with said binder to form thereof respective semi-finished articles;
  c) removing said carriers from said semi-finished articles to form thereof said respective preforms having said respective preform contours, which respectively correspond to a positive or a negative of respective portions of a structural element contour of said structural element that is to be manufactured;
  d) arranging said preforms together with one another, and compacting said preforms;
  e) before, during or after said step d), impregnating said preforms with a matrix material comprising a curable resin; and
  f) after said steps d) and e), curing said matrix material comprising said curable resin, to bond together, stiffen and harden said preforms, and thereby to form thereof said structural element having said structural element contour;

wherein each one of said preforms respectively has a plan shape surrounding an opening and has a cross-sectional shape including plural flanges that extend at an angle relative to each other, wherein said step d) comprises arranging said preforms so that respective adjacent ones of said flanges of neighboring ones of said preforms run parallel along one another so as to form thereof said structural element including a main frame body and a frame web protruding from said main frame body relative to a major plane of said structural element.

2. The method according to claim 1, wherein said curing is carried out under an elevated temperature and/or an elevated pressure.

3. The method according to claim 1, wherein said step e) is performed after said step d).

4. The method according to clam 1, wherein said arranging and said compacting of said preforms forms said preforms into an intermediate component that is highly densified and has a contour nearly corresponding to said structural element contour in a finished condition of said structural element.

5. The method according to claim 1, further comprising a preliminary step of making said textile semi-finished materials by carrying out a textile production process, and wherein said step a) of arranging said semi-finished materials on said carriers is carried out directly following said textile production process, without intermediately arranging said semi-finished materials on temporary storage carriers.

6. The method according to claim 1, wherein said step a) further comprises positioning and holding said semi-finished materials on said carriers using fixing pins, clamp elements, grippers, or transport and clamping bands.

7. The method according to claim 1, wherein said step a) further comprises pressing said semi-finished materials against said carriers using counter-pressing elements.

8. The method according to claim 1, wherein said step a) further comprises reforming and draping said semi-finished materials onto said carriers so as to reorient as-yet unfixed fibers of said semi-finished materials into a desired orientation.

9. The method according to claim 1, wherein, in said step b), said binder is applied as a liquid, a paste, a powder, threads, a web or a sheet.

10. The method according to claim 9, wherein said step b) further comprises activating said binder using hot air heating, flame heating, infrared heating, induction heating, laser heating, contact heating, or microwave heating.

11. The method according to claim 1, wherein each one of said preforms is made up of a single textile layer of one of said textile semi-finished materials, and has a continuous complete oval shape or a shape of a segment of an oval.

12. The method according to claim 1, wherein each one of said preforms is made up of plural textile layers of at least one of said textile semi-finished materials, and has a continuous complete oval shape or a shape of a segment of an oval.

13. The method according to claim 1, wherein said structural element is a window frame for an aircraft window.

14. The method according to claim 1, wherein said preforms include first, second and third preforms, said first preform has two said flanges with a first said angle therebetween, said second preform has two said flanges with a second said angle therebetween, said third preform has two said flanges with a third said angle therebetween, said third angle is less than or equal to 180°, said first, second and third angles together sum to 360°, said two flanges of said third preform together with first ones of said flanges of said first and second preforms form said main frame body, and second ones of said flanges of said first and second preforms together form said frame web protruding from said main frame body.

15. The method according to claim 1, further comprising inserting a core member between adjacent ones of said flanges of said preforms.

16. The method according to claim 1, wherein:
said step a) of arranging the respective fiber textile semi-finished materials respectively on plural carriers comprises using a supply head to supply the respective fiber textile semi-finished materials,
said plural carriers comprises a carrier and reforming tool having said carrier contours comprising at least a cylindrical receiving surface or an annular receiving surface that receives the respective semi-finished material thereon, and
said step a) further comprises rotating at least one of said supply head and said carrier and reforming tool relative to the other so as to lay the respective semi-finished material from said supply head onto said respective receiving surface of said carrier and reforming tool.

17. The method according to claim 16, wherein said carrier and reforming tool comprises a drum having said cylindrical receiving surface and a bounding flange disc secured on a side of said drum, and wherein said step a) includes rotating said drum.

18. The method according to claim 17, wherein said bounding flange disc has a larger diameter than said drum, protrudes radially outwardly beyond said cylindrical receiving surface, and has said annular receiving surface on a side face thereof, and wherein said step a) includes laying at least one of said textile semi-finished materials on said annular receiving surface on said side face of said bounding flange disc.

19. The method according to claim 18, wherein said annular receiving surface is arranged at a disc angle relative to said cylindrical receiving surface, wherein said disc angle corresponds to a respective said angle formed between two of said flanges of the respective preform that is produced in said step c).

20. The method according to claim 16, wherein said step c) of arranging the respective fiber textile semi-finished materials further comprises using a counter-pressing element that cooperates with said cylindrical receiving surface and/or said annular receiving surface to position and press the respective semi-finished material thereagainst.

21. The method according to claim 20, wherein said counter-pressing element is equipped with a heating or cooling device, and further comprising heating or cooling the respective semi-finished material using said heating or cooling device.

22. The method according to claim 16, wherein said carrier and reforming tool comprises a disc having said annular receiving surface on a side face thereof, and wherein said step a) includes rotating said disc.

23. The method according to claim 22, wherein said annular receiving surface has two annular surface portions that extend at a surface angle relative to each other, wherein said surface angle corresponds to a respective said angle formed between two of said flanges of the respective preform that is produced in said step c).

24. The method according to claim 16, further comprising positioning said supply head relative to said carrier and reforming tool so as to achieve a defined positioning of the respective semi-finished material on said respective receiving surface.

25. The method according to claim 16, wherein said carrier and reforming tool comprises a circular ring-shaped first die part including said annular receiving surface on a face surface thereof and said cylindrical receiving surface on an inner circumferential surface thereof, a second die part, and a draping tool, and further comprising moving said second die part selectively adjacent to and away from said first die part, and moving said draping tool along said first die part after moving away said second die part so as to drape and reform a portion of the semi-finished material along said cylindrical receiving surface.

26. The method according to claim 1, wherein said plan shape is a curvilinear plan shape, and said opening is a curvilinear opening, and said step a) includes rotating said carriers while arranging said semi-finished materials thereon.

27. The method according to claim 1, wherein said plan shape is an oval plan shape, and said opening is an oval opening, and said step a) includes rotating said carriers while arranging said semi-finished materials thereon.

28. The method according to claim 1, wherein said frame web protrudes from said main frame body substantially perpendicularly relative to said major plane of said structural element.

29. The method according to claim 1, wherein said arranging and said compacting of said preforms in said step d) forms said preforms into an intermediate component that is highly densified and has a contour nearly corresponding to said structural element contour in a finished condition of said structural element, and wherein said step e) of impregnating said preforms is performed after said step d) of arranging and compacting said preforms.

* * * * *

UNITED STATES PATENT AND TRADEMARK OFFICE
CERTIFICATE OF CORRECTION

| | |
|---|---|
| PATENT NO. | : 7,175,795 B2 |
| APPLICATION NO. | : 10/385289 |
| DATED | : February 13, 2007 |
| INVENTOR(S) | : Eberth et al. |

Page 1 of 1

It is certified that error appears in the above-identified patent and that said Letters Patent is hereby corrected as shown below:

Title page,
Item [56], References Cited, U.S. PATENT DOCUMENTS,
Line 1, after "8/1939", replace "Schulz et al." by --Berndt et al.--;

Column 7,
Line 54, after "17", replace ".and" by --and--;

Column 9,
Line 53, after "carriers", replace "comprises" by --comprise--.

Signed and Sealed this

Nineteenth Day of June, 2007

JON W. DUDAS
*Director of the United States Patent and Trademark Office*